United States Patent
Dahl

(10) Patent No.: US 6,356,939 B1
(45) Date of Patent: Mar. 12, 2002

(54) INTERACTIVE THEATER AND FEATURE PRESENTATION SYSTEM

(75) Inventor: Andrew A. Dahl, Bloomfield Hills, MI (US)

(73) Assignee: Dawber and Company, Inc., Bloomfield Hills, MI (US)

( * ) Notice: Subject to any disclaimer, the term of this patent is extended or adjusted under 35 U.S.C. 154(b) by 0 days.

(21) Appl. No.: 09/189,256

(22) Filed: Nov. 10, 1998

Related U.S. Application Data

(63) Continuation-in-part of application No. 08/849,225, filed as application No. PCT/US96/15832 on Oct. 3, 1996, now Pat. No. 5,835,715.
(60) Provisional application No. 60/004,964, filed on Oct. 6, 1995.

(51) Int. Cl.[7] .............................................. G06F 15/16
(52) U.S. Cl. .......................................... 709/209; 455/2
(58) Field of Search ............................ 709/209; 455/2; 434/351; 348/2.61

(56) References Cited

U.S. PATENT DOCUMENTS

| | | | |
|---|---|---|---|
| 3,602,582 A | 8/1971 | Torricelli | 455/2 |
| 4,477,069 A | 10/1984 | Crudgington, Jr. | 434/351 |
| 4,896,209 A | 1/1990 | Matsuzaki et al. | 455/2 |
| 5,226,177 A | 7/1993 | Nickerson | 455/2 |
| 5,273,437 A | 12/1993 | Caldwell et al. | 434/351 |
| 5,307,055 A * | 4/1994 | Baskin et al. | 345/1 |
| 5,365,266 A | 11/1994 | Carpenter | 348/61 |
| 5,801,754 A * | 9/1998 | Ruybal et al. | 348/13 |
| 5,835,715 A * | 11/1998 | Dahl | 395/200.39 |

* cited by examiner

Primary Examiner—John A. Follansbee
(74) Attorney, Agent, or Firm—John R. Benefiel

(57) ABSTRACT

A interactive system (10) for presenting information to members of an audience includes a main server (11) connected to a slave server (13), a video projector (19) connected to the slaver server for displaying information to all members of an audience, a memory in the main server and a laser disc unit (21) connected to slave server for storing information related to a plurality of categories and a plurality of topics related to each of the categories, and a plurality of seat computers (16) connected through an audience response server (14) to the main server. Each seat computer generates category selection signals and topic selection signals upon actuation by an associated audience member and displays the stored information to the associated audience member. The main server (11) is responsive to the category selection signals for controlling the video projector (19) to display the stored information related to at least a first topic choice related to a first category choice of the audience on a screen (20) visible to the audience. For each audience member who did not select the first category choice, the main server (11) controls the associated seat computer to display the stored information related to another one of the categories selected by the audience member.

2 Claims, 5 Drawing Sheets

US 6,356,939 B1

INTERACTIVE THEATER AND FEATURE PRESENTATION SYSTEM

This application is a continuation in part of U.S. Ser. No. 08/849,225, now U.S. Pat. No. 5,835,715, filed May 30, 1997, which is a 371 of PCT/US76,15832, filed Oct. 3, 1996, which claims priority from U.S. Provisional Application Ser. No. 60/004,964, entitled "Interactive Theater and Feature Presentation System", filed Oct. 6, 1995.

BACKGROUND OF THE INVENTION

The present invention relates generally to an apparatus for teaching and entertainment and, in particular, to an apparatus for interactively presenting information in multiple formats simultaneously to an audience.

The U.S. Pat. No. 5,226,177 shows a real-time audience response system in which the audience is looking at a common display.

The U.S. Pat. No. 5,307,055 shows a computer display system in which a hand-held remote control is utilized to select stored images to be displayed on a primary display and also different images to be displayed on a secondary display located on the remote control means.

SUMMARY OF THE INVENTION

The present invention concerns an apparatus for interactively presenting information to members of an audience including a computer server means, a visual display means connected to the computer server means for displaying information to all members of an audience, an information storage means connected to the computer server means for storing information related to a plurality of categories and a plurality of topics related to each of the categories, and a plurality of seat computer means connected to the computer server means. Each seat computer means generates category selection signals and topic selection signals upon actuation by an associated member of the audience and displays the stored information to the associated audience member. The computer server means is responsive to the category selection signals for controlling the visual display means to display the stored information related to at least a first topic choice related to a first category choice of the audience and, for each audience member who did not select the first category choice, for controlling the associated seat computer means to display the stored information related to another one of the categories selected by the audience member. The computer server means includes a main server connected to a slave server through a server hub and an audience response server connected to the server hub and to the seat computer means through a network hub. The information storage means includes a memory in the main server and a laser disc unit connected to the slave server.

The information storage means can include an audio means for generating sounds related to the stored information being displayed to all the members of the audience by the visual display means. The apparatus can include lighting means connected to the computer server means for generating lighting effects related to the stored information being displayed to all the members of the audience by the visual display means. The apparatus also can include at least one robot means connected to the computer server means for moving in relation to the stored information being displayed to all the members of the audience by the visual display means.

The invention also concerns a method of operating the apparatus including the steps of: displaying the plurality of categories of information on the visual display means and at the seat computer means; sensing with the computer server means the category selection signals generated by the audience members and determining the first category choice; displaying the plurality of topics of information related to the first choice category on the visual display means and at the seat computer means associated with the audience members who selected the first choice category; sensing with the computer server means the topic selection signals generated by the audience members and determining the first topic choice; displaying the stored information related to the first topic choice related to the first category choice of the audience on the visual display means and on the seat computer means of each audience member who selected the first category choice; and displaying the stored information related to another one of the categories selected by the audience member on the seat computer means of the audience member who selected the another category choice.

BRIEF DESCRIPTION OF THE DRAWING

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The interactive theater and feature presentation system according to the present invention differs from prior art interactive information display systems in which the majority rules. The present system allows each member of the audience to create his or her own, individual experience based upon personal preferences and areas of interest. Furthermore, the sophistication of the programming allows for scaling the comprehension levels to the audience-slower and simpler for small children and those unfamiliar with computer interfaces; faster and more complex for the computer literate or multimedia savvy. The system permits each audience member to branch out into areas of interest during the overall presentation, tying all the areas together.

Figure 1:
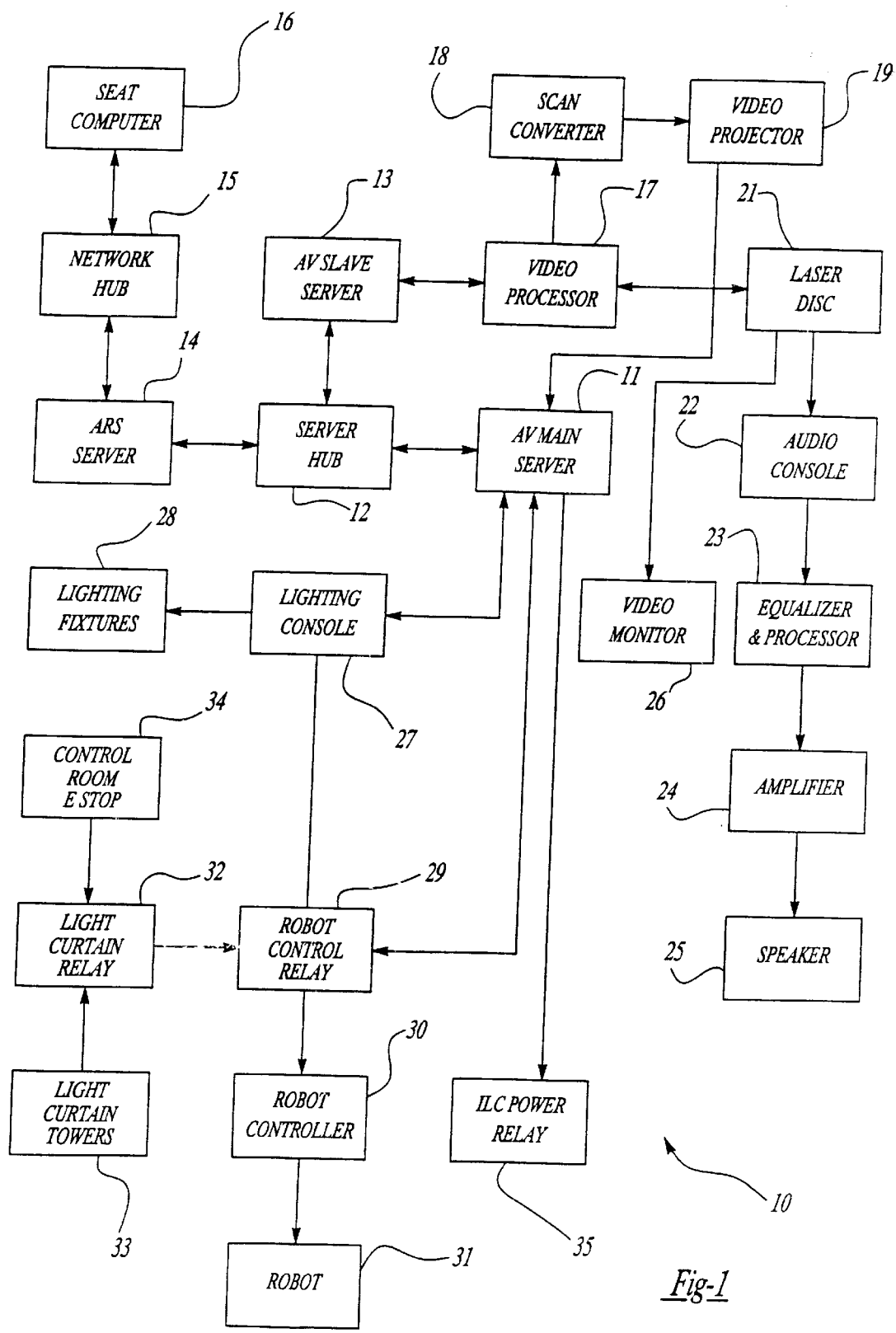
FIG. 1 is a schematic block diagram of an interactive presentation system in accordance with the present invention.

There is shown in the FIG. 1 a schematic block diagram of an interactive presentation system 10 according to the present invention. A first server computer 11 functions as an audio/visual (AV) main server for the system 10. The AV main server 11 is connected through a server hub 12 to a second server computer 13 which functions as an AV slave server. The servers 11 and 13 can be Micron ASSY.PCI (M54HI) Millenia Series BP computers and the hub 12 can be a Linksys 8-port Ethernet Workgroup v.B1 server hub unit. The server hub 12 also is connected to a third server computer 14 which functions as an audience response server (ARS) 14 which can be an NEC Express RISCserver computer. The ARS server 14 is connected through a network hub 15 to a plurality of seat computers 16. The seat computers 16 each can be a Databrick 486 DX/66 computer. The configuration of the network hub 15 depends upon the number of the seat computers used. For example, a Net-Worth PowerPipe Ethernet/FDDI switching hub connected to ten Hewlett-Packard J2600A AdvanceStack 10-Base-T hubs and three AT&T 1100 Cat 5 modular jack panels can function as the network hub 15 serving up to one hundred of the seat computers 16. As explained below, the seat computers 16 are utilized by audience members to select presentation sequences to be displayed on both a main display screen, visible to the entire audience, and on a seat computer display, visible only to the individual audience member.

The AV slave server 13 also is connected to a video processor 17 which can be two Matrox Illuminator Pro video processor cards installed in the slave server. The video processor 17 is connected through a scan converter 18 to a video projector 19. The scan converter 18 can be two Faroudja LQ 400 video processors, one for each video processor card, and the video projector 19 can be two Hughes/JVC 320 units, one for each scan converter. The video projector 19 also is connected to the AV main server 11 and projects images on a rear projection screen 20 (FIG. 2), each video projector unit displaying images on a corresponding half of the screen. The video processor 17 is connected to a laser disc 21 which can include four Pioneer LD V8000 Laserdisc players for generating video images to the video projector 19. The laser disc 21 could alternatively be a DVD player or storage of MPEG-2 files, such as in a computer hard drive.

The laser disc 21 is connected to an audio console 22 which is connected to an equalizer and processor 23 for generating audio associated with the video displays. The equalizer and processor 23 is connected through an amplifier 24 to a speaker 25. The audio console 22 can be a Makie CR1604-VLZ 16-channel mic/line mixer, the equalizer and processor 23 can be a Furman Q-602 graphic equalizer and a Furman X-324 signal processor, the amplifier 24 can be a Furman PS-8 power sequencer and two Renkus-Heinz P200 amplifiers, and the speaker 25 can include two Renkus Heinz TRS121 speakers, two Renkus Heinz LFS121CNT speakers and two JBL Control 1 speakers. Also included in the laser disc 21 is a Pioneer LD V8008 Laserdisc player which is connected to a video monitor 26 which is installed in an eye of a robot as described below.

The AV main server 11 is connected to a lighting console 27 which can be a Pulsar Masterpiece lighting board and a Pulsar Universal Interface #27300. The lighting console is connected to lighting fixtures 28 which can include a plurality of commercially available lights for generating desired lighting effects. The AV main server 11 also is connected through a robot control relay unit 29 to a robot controller 30 which is connected to a robot 31. The controller 30 and the robot 31 can be three separate robots which control movements of two arms and a head as described below. The arms can be operated by two Nachi Robot Model SC15 AR units and the head can be operated by a Nachi Robot Model SA100 AR unit, the units being mounted on a track such as a thirty-three foot 7th Axis Slide with twenty feet of travel. A light curtain relay unit 32 is connected to the robot control relay unit 29, to a light curtain tower 33 and to a control room emergency (E) stop unit 34 for stopping the movement of the robot 31. The AV main server 11 is connected to an ILC power relay unit 35 for controlling the application of power to the various components of the system 10.

Figure 2:
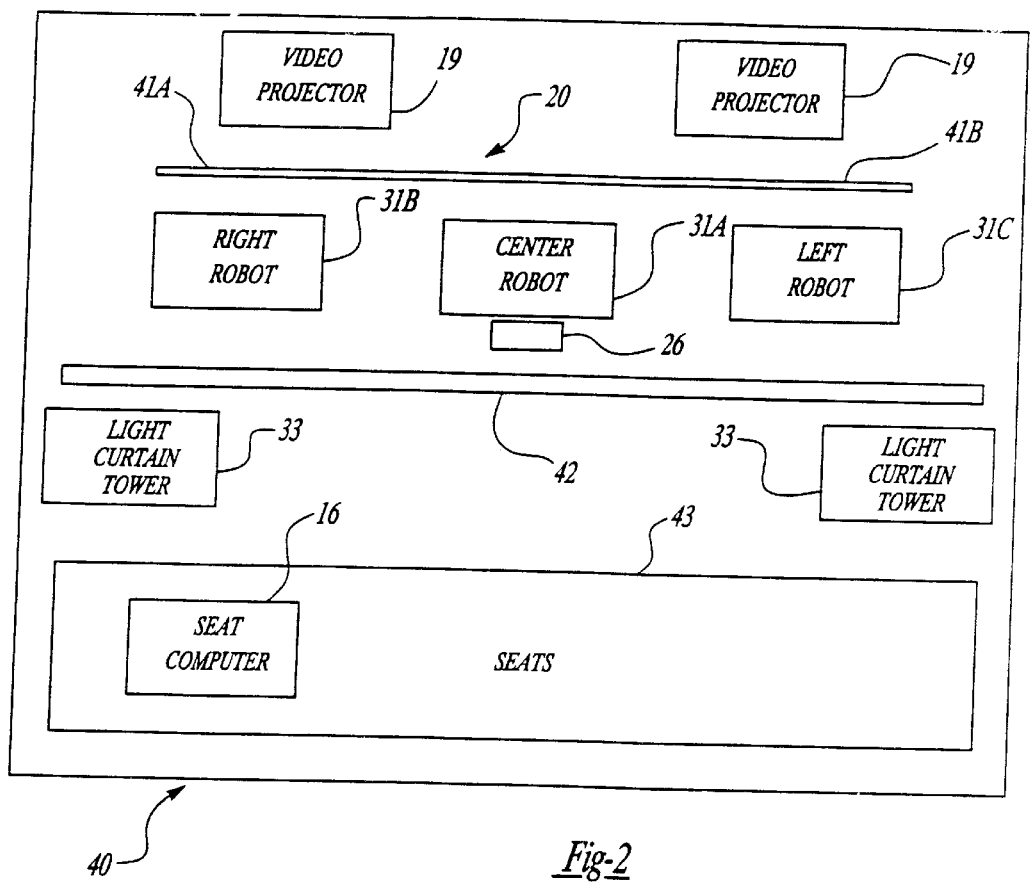
FIG. 2 is schematic plan view of the system shown in the FIG. 1 installed in a theater.

There is shown In the FIG. 2 a schematic plan view of the system 10 installed in a theater 40. A pair of the video projectors 19 at the front of the theater 40 are positioned behind the rear projection screen 20 for projecting images on a first portion or left half 41a and a second portion or right half 41b of the screen. Three of the robots 31 are positioned in front of the screen to simulate an imaginary creature. The robots include a center robot 31a configured as a head of the creature with a single eye being the video monitor 26, a right robot 31b configured as a right arm of the creature and a left robot 31c configured as a left arm of the creature. The robots 31a, 31b and 31c are located between the screen and a berm wall 42 which hides the bases of the robots and the track (not shown, but described above) along which the robots can move parallel to the berm wall. Located on the opposite side of the berm wall 42 at opposite ends thereof is a pair of the light curtain towers 33 for sensing moving or stationary objects such as people approaching the berm wall. Upon sensing such an object, the light curtain towers 33 send a signal to the robot control relay unit 29 to stop any motion of the robots 31a, 31b and 31c. At the rear of the theater 40, a plurality of seats 43 are located for the audience. Each of the seats 43 is equipped with one of the seat computers 16.

The AV main server 11 provides control and synchronization during show calls between the robots 31, the laser disc players 21, the lighting console 27, and the communication to the AV slave server 13 and the ARS server 1. The AV slave server 13 takes commands from the AV main server 11 to display the full screen majority choice video, windowed second choice video, and third choice still graphic background on the projection screen 20. It switches video among the laser discs 21 via the video processor 17 for output to the scan converter 18. The ARS server 14 facilitates the control and organization of the distributed database and response system. It communicates directly with each of the seat computers 16 in the theater and the AV main server 11. All audience input is analyzed by the ARS server 14 to determine the appropriate show calls, and will make them randomly if there is no input. The server hub 12 isolates communication between the servers from the rest of the network for greater efficiency. The network hub 15 facilitates communication of the audience responses to the show control, and cues database access back to the audience.

Figure 3:
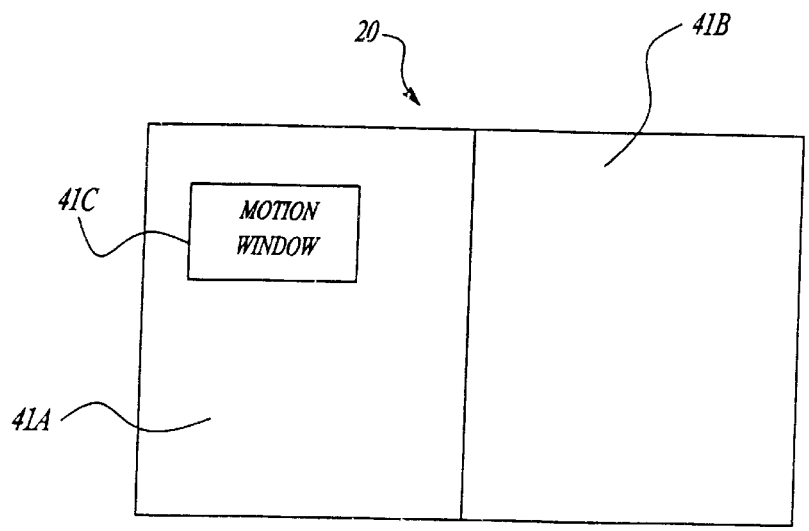
FIG. 3 is a front elevation view of the screen shown in the FIG. 2.

In the FIG. 3, the screen 20 is shown in front elevation as having the left half 41a and the right half 41b. Each member of the audience uses his or her seat computer 16 to select one of a plurality of categories to be presented and select one of a plurality of topics for the selected category. For example, the system 10 can display a plurality of category icons on both the screen 20 and on an LCD touchscreen associated with the seat computer 16. The "votes" are transmitted to the ARS server 14 which calculates the first, second and third category choices. Next, a plurality of topic icons for the first category choice are displayed on the screen 20 and on the touchscreens of the audience members who selected the first category choice. An audience member who did not vote for the first choice category has the opportunity to switch to the first choice before the topic votes are transmitted. An audience member who does not switch has a plurality of topic icons for his or her selected category displayed on the LCD touchscreen.

The audience votes for the topic of choice related to the first choice category and these votes are used to calculate the first, second and third choice topics. A presentation or show video related to the three chosen topics is displayed on the right half 41b of the screen 20, while a compilation of images related to the second choice category is displayed in a window 41c in the upper left of the left half 41a of the screen and a still image and tell related to the third choice category is displayed on the remainder of the left half of the screen. Those audience members having selected the first choice category have a different set of four icons displayed on the LCD touchscreen of the seat computer during the show for each of the chosen topics. Selection of an icon displays a still image and text related to the topic being displayed.

Figure 4:
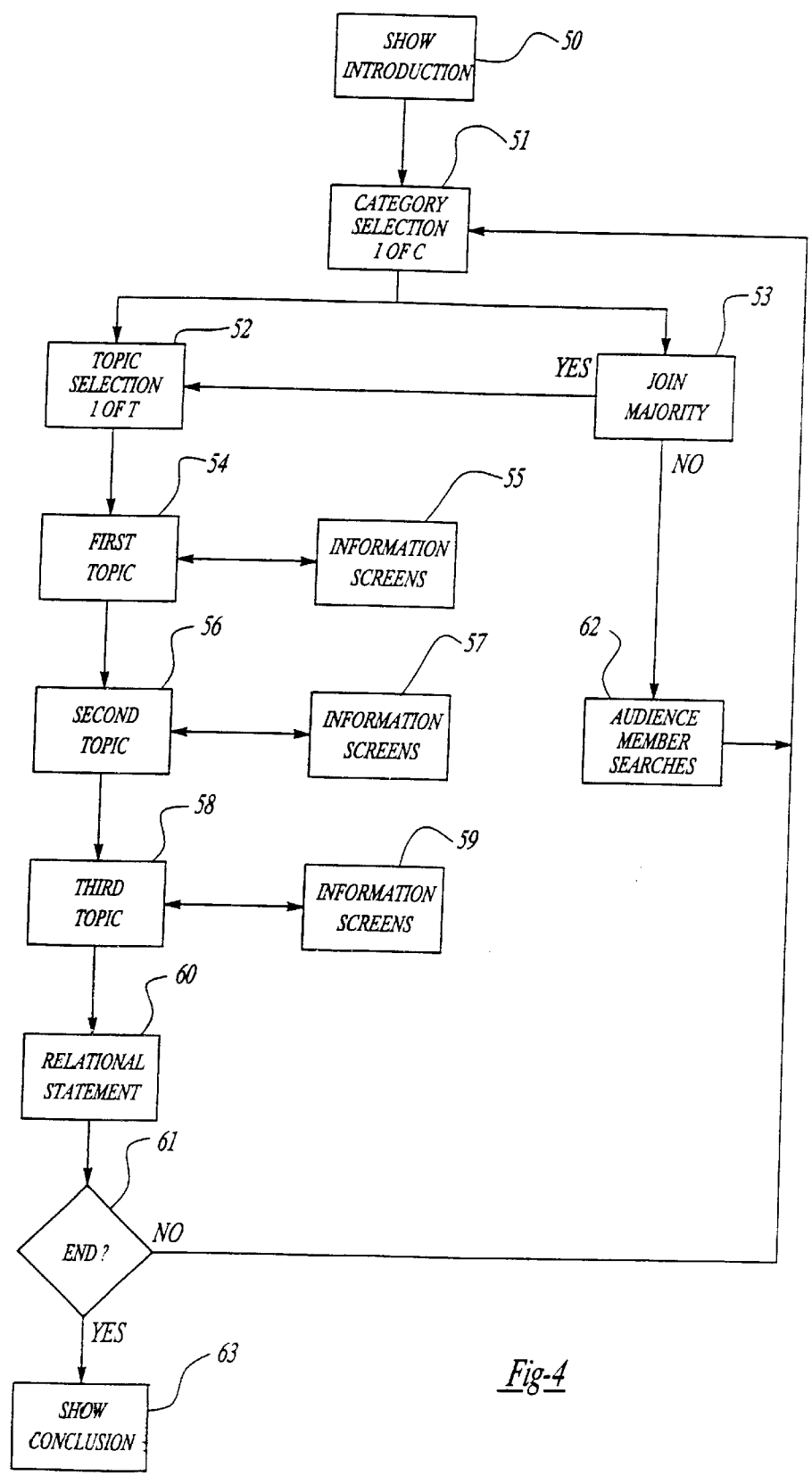
FIG. 4 is a flow diagram of the method of operation of the system shown in FIG. 1.
Figure 5:
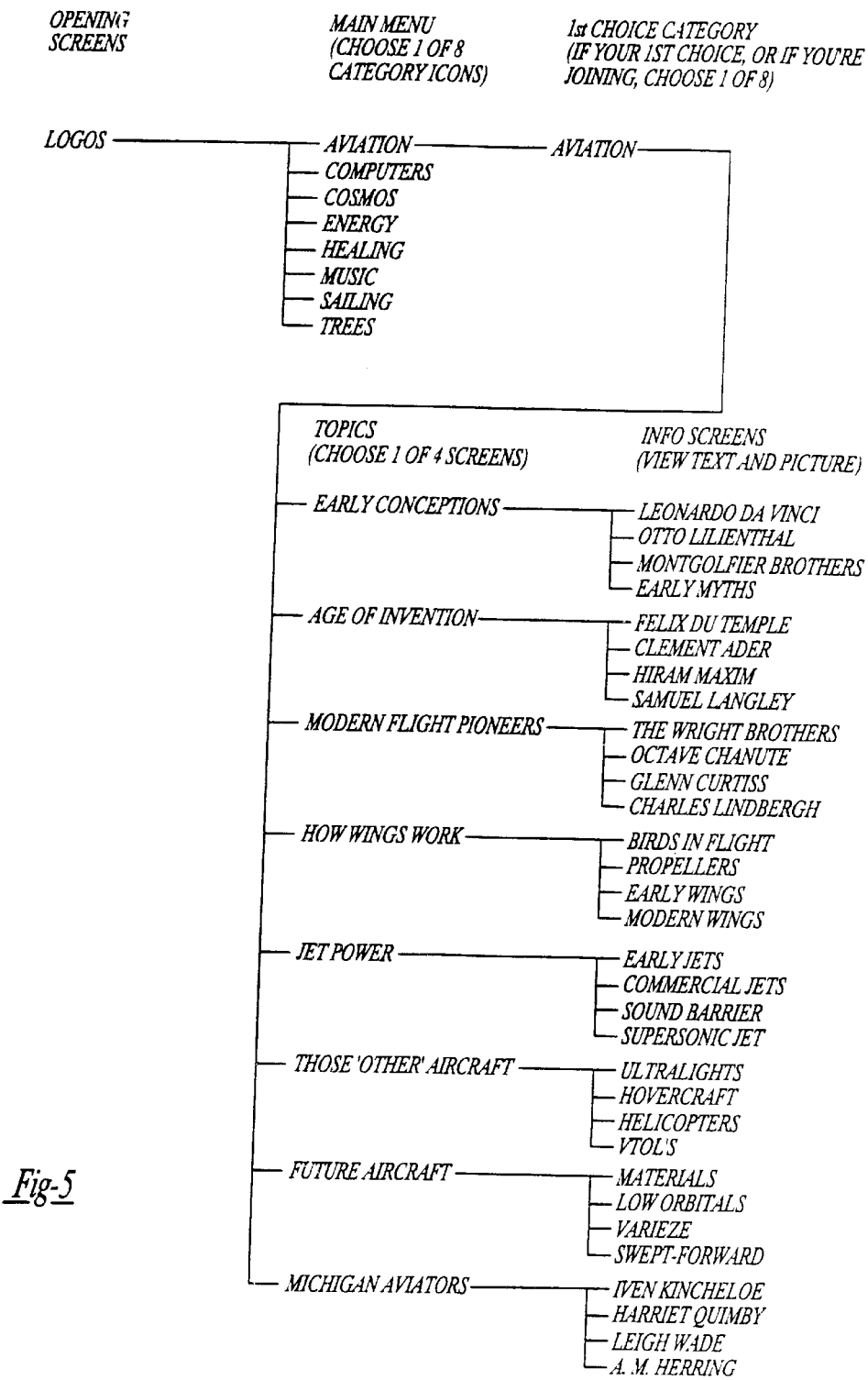
FIG. 5 is a flow diagram of category and topic choices for a specific example of the method of operation shown in the FIG. 4.

There is shown in the FIG. 4 a flow diagram of the method of operation of the system 10. The method begins at an instruction set SHOW INTRODUCTION 50 wherein a human operator selects a "new show" choice from a menu displayed by the ARS server 14. An approximately two minute introduction sequence is run which can include robot motions, images displayed on the screen 20, lights and sounds. Then, an instruction set CATEGORY SELECTION 1 OF C 51 is entered for audience voting to determine the first, second and third choice categories as described above. The audience members vote for one of the number "C" categories where "C" can be, for example, "eight" as shown in the FIG. 5. The first choice category selection (Aviation in the FIG. 5) directs the method to an instruction set TOPIC SELECTION 1 OF T 52 for audience voting to determine the first, second and third choice topics as described above. The audience members vote for one of the number "T" topics where "T" can be, for example, "eight" as shown in the FIG. 5. Any other category selection directs the method to an instruction set JOIN MAJORITY 53 to provide audience members with the opportunity to join the first choice category at "YES" or to remain in the selected category at "NO".

The first choice category directs the method to a series of instruction sets which display shows on the top three choice topics related to the first choice category. An instruction set FIRST TOPIC 54 displays the first topic on the right half 41b of the screen 20. The robots 31 are moved on the track in front of the left half 41a of the screen 20. If it is desirable to display topics related to certain first choice categories on the left half 41a of the screen 20, the arrangement shown in the FIG. 3 can be reversed. An instruction set INFORMATION SCREENS 55 displays the above described four icons on the LCD touchscreens of the seat computers 16 for selecting among, for example, the four subjects shown in the FIG. 5. After the first topic is displayed on the screen 20, the method enters an instruction set SECOND TOPIC 56 to display the second topic on the right half 41b of the screen. An instruction set INFORMATION SCREENS 57 displays the above described four icons on the LCD touchscreens of the seat computers 16. After the second topic is displayed, the method enters an instruction set THIRD TOPIC 58 to display the third topic on the right half 41b of the screen. An instruction set INFORMATION SCREENS 59 displays the above described four icons on the LCD touchscreens of the seat computers 16.

After the three topics have been displayed, the method enters an instruction set RELATIONAL STATEMENT 60 which makes a verbal and visual connection between the first and second choice topics. Next, the method determines whether another category is to be selected in a decision point 61. If the presentation is not at the end, the method branches at NO" and returns to the instruction set SELECT CATEGORY 1 OF C 51. The method can limit the number of returns to the instruction set 51 and can prevent repeating of categories. For any member of the audience who does not join the first choice category, the method branches from the instruction set 53 at "NO" and enters the instruction set AUDIENCE MEMBER SEARCHES 62 to display on the LCD touchscreen of the member computer 16 a plurality of topic icons related to the selected category to enable the viewing of information about that category. If the selected topics for the final category have been displayed, the method branches from the decision point 61 at "YES" and enters an instruction set SHOW CONCLUSION 63 to display a final sequence of video, lights, sound and robot motion.

The above described method of operation can be utilized with the system 10 in the form of a computer program stored in the memories of the servers 11, 13 and 14. Video and audio information is stored on the laser disc unit 21 for use in displaying the first choice category information. The above described method of operation can be utilized with the system 10 in the form of a computer program stored in the memories of the servers 11, 13 and 14.

In summary, the system or apparatus 10 for interactively presenting information to members of an audience includes: the computer server means 11,13,14; the visual display means 19,20 connected to the computer server means for displaying information to all members of the audience; the information storage means 11,21 connected to the computer server means 11,13,14 for storing information related to a plurality of categories and a plurality of topics related to each of the categories; and the plurality of seat computer means 16 connected to the computer server means, each seat computer means generating category selection signals and topic selection signals upon actuation by an associated member of the audience and for displaying the stored information to the associated member of the audience, the computer server means being responsive to the category selection signals for controlling the visual display means to display the stored information related to at least a first topic choice related to a first category choice of the audience and, for each audience member who did not select the first category choice, controlling the associated seat computer means to display the stored information related to another one of the categories selected by the audience member. The system 10 is operated by a method including the steps of: displaying the plurality of categories of information on the visual display means 19,20 and at the seat computer means 16; sensing with the computer server means the category selection signals generated by the audience members and determining the first category choice; displaying the plurality of topics of information related to the first choice category on the visual display means and at the seat computer means associated with the audience members who selected the first choice category; sensing with the computer server means the topic selection signals generated by the audience members and determining the first topic choice; displaying the stored information related to the first topic choice related to the first category choice of the audience on the visual display means and on the seat computer means of each audience member who selected the first category choice; and displaying the stored information related to another one of the categories selected by the audience member on the seat computer means of the audience member who selected the another category choice.

Figure 6:
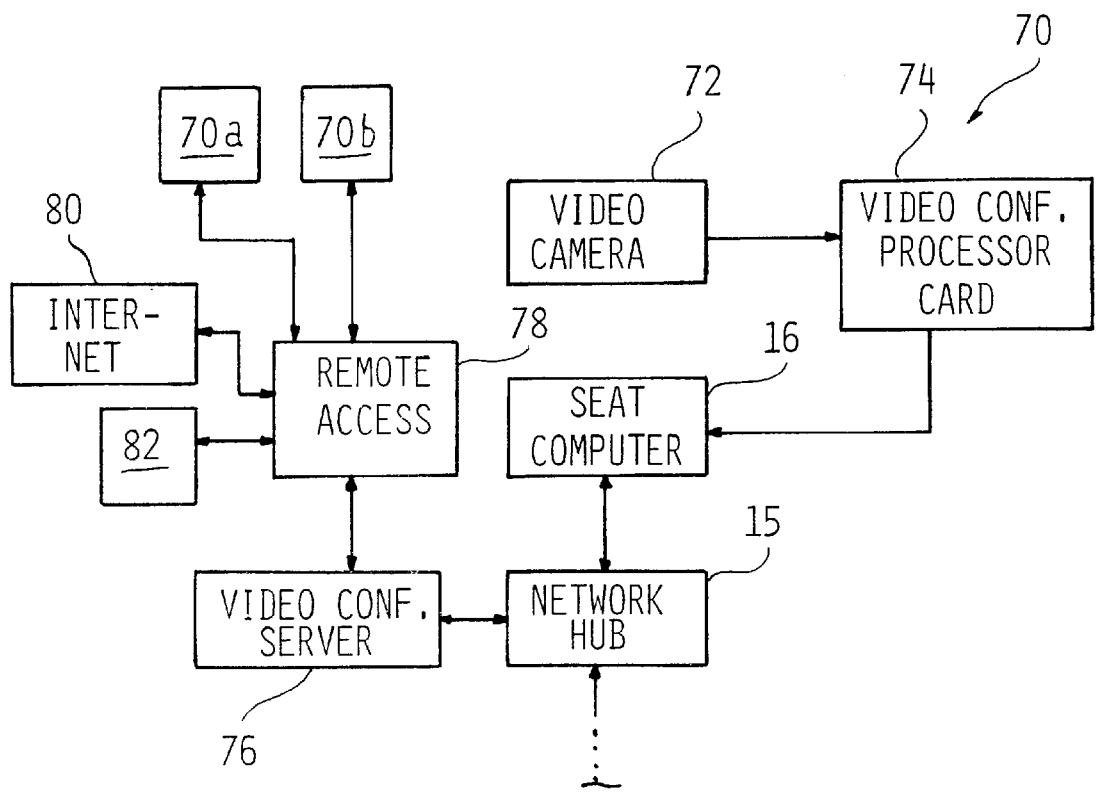
FIG. 6 is a schematic block diagram of an alternative embodiment of the interactive presentation system of FIG. 1.

An alternate presentation system 70 according to the present invention is shown in FIG. 6, generally including all of the components, features and functions described above with respect to FIGS. 1–5 except as will be described below. All other components from FIG. 1, not shown in FIG. 6 (i.e., beyond network hub 15) are identical to FIG. 1.

Installed at each seat is a video camera 72 directed toward the occupant. The video camera 72 is connected to the seat computer 16 via a video conference processor card 74. The network hub 15 is connected to a video conference server 76. The video conference server 76 is connected to a remote access line 78, such as an ISDN line, T1 connection, modem, etc. The remote access line 78 provides video conferencing connections to multiple other presentation systems 70a and 70b, which may be identical to video presentation systems 70 or 10. The remote access line 78 also provides connection to the Internet 80. The remote access 78 also provides connection to other video conferencing sources 82, such as commonly available video conferencing sites (i.e., sites other than presentation systems 10, 70 of the present invention).

In operation, the seat computer 16 would offer its audience member an option of video conferencing, such as with another audience member in another presentation system 70a at a remote location, such as in a different country. This would allow the audience members in the presentation system 70 to interact with other audience members in different geographic locations regarding the presentation categories.

The seat computer 16 may also offer the option of accessing information on the Internet 80. In this manner, presentation information for multiple presentation systems 70 could be updated at a central location on the Internet 80. The seat computer 16 would also offer its occupant the option of video conferencing with the remote video conferencing site 82 which may be located at a geographic location related to the presentation category and at which may be located an expert on the presentation category. Thus, the presentation system 70 could include these live connections to video presentation material.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An interactive presentation system comprising:

a first display for displaying information to all members of an audience;

a plurality of seat computers, each receiving input signals from an associated member of said audience indicating category selections and topic selections, each said seat computer displaying information to the associated member, said first display displaying information related to at least a first topic choice related to a first category choice of the audience and, each seat computer associated with a member who did not select said first category choice displaying information related another one of said categories selected by the associated audience member;

a video camera associated with each of said seat computers, each said video camera directed toward the associated audience member;

a video conferencing system combining one or more video signals from said video cameras and receiving video signals from a remote location and displaying combined video signals either by said first display or by one or more of said seat computers.

2. The interactive presentation system of claim 1 wherein said interactive presentation system is a first interactive presentation system, further including a second interactive presentation system at said remote location.

\* \* \* \* \*